Aug. 12, 1969   C. J. GREEN   3,461,364
NONUNIFORM ELECTRIC FIELD PROCESS AND APPARATUS
Filed Sept. 19, 1966   2 Sheets-Sheet 1

INVENTOR
CARL J. GREEN
BY
Mason, Mason & Albright
ATTORNEYS

United States Patent Office 3,461,364
Patented Aug. 12, 1969

3,461,364
NONUNIFORM ELECTRIC FIELD PROCESS AND APPARATUS
Carl J. Green, 1704 McClain Road,
Knoxville, Tenn. 37912
Continuation-in-part of application Ser. No. 247,249,
Dec. 26, 1962. This application Sept. 19, 1966, Ser.
No. 580,482
Int. Cl. H01g 9/16
U.S. Cl. 317—262                    2 Claims

ABSTRACT OF THE DISCLOSURE

Apparatus and method whereby a nonuniform electric field has a modulated frequency which vibrates a resilient dipolar object located in such field in accordance with the applied modulated frequency.

---

This is a continuation-in-part application of my application Ser. No. 247,249, now abandoned, filed Dec. 26, 1962. The invention relates to the production of dielectrophoretic forces and the manipulation thereof. More particularly, it involves the inducement of a nonuniform electric field which effectively converges at a location removed from the electrodes producing the field, and the application of a modulated frequency to a nonuniform field to test, treat, or otherwise react upon a substance which is subjected thereto.

The phenomena that uncharged bodies may be set in motion by nonuniform electric fields has been known for a number of years. Yet to date the utilizations of this phenomena for commercial purposes have been quite limited. One of the problems which has discouraged advancement in this art is that nonuniform fields have been largely limited to space existing between a pair of electrodes, one of such electrodes being smaller than the other to create the nonuniformity of the field. If the smaller electrode is too small, the field immediately around it reaches very high values with a result that molecules approaching the same tend to become charged under the very high electrical values in the immediate vicinity of the smaller electrode. The same occurs if too high differential voltage is employed. Additionally, it appears that experimenters in the field have generally employed direct currents or ordinary alternating currents and it has not occurred to them that useful and practicable results might be obtained by the application of a modulating frequency to the nonuniform field.

In view of the foregoing, it is an object of this invention to apply a modulated frequency to a nonuniform electric field to react upon or with a substance within such field. It is a further object of the invention to produce a nonuniform electric field wherein the resultant dielectrophoretic forces extend in a direction away from the electrodes producing the field.

Other objects, adaptabilities and capabilities will appear as the description progresses, reference being had to the accompanying drawings, in which.

Figure 1:
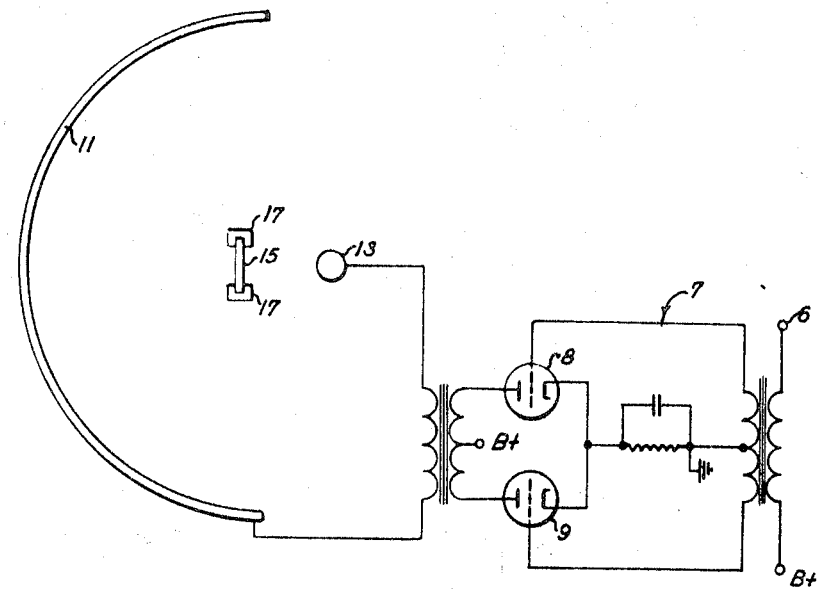
FIGURE 1 is a diagrammatic showing of apparatus to produce a modulated nonuniform electric field.

Referring to FIGURE 1, a conventional type Class B push-pull circuit designated generally 7 is utilized to supply voltages of opposite instantaneous polarity to the grids of tubes 8 and 9, as shown. It will be appreciated by those skilled in the art that a modulated frequency, say an audio frequency, received at input 6 will be amplified by the tubes 8 and 9 in opposite directions of polarity whereby a comparatively high voltage is applied to the electrodes 11 and 13. Electrode 11 is a large curved electrode whereas the electrode 13 is a smaller electrode. In accordance with the teachings of the art, since electrodes 11 and 13 are of opposite polarity, a nonuniform electric field which is a function of the voltage bias between electrodes 11 and 13 is then produced therebetween. A substance 15, which in this embodiment may be a resilient organic plastic material of high polarizability, is fixed in place by holders 17 which are preferably material of a low polarizability and are secured in an appropriate manner to render them as rigid as possible. By the application of voltages conforming to audio frequencies at the input 6, such frequencies are amplified electrically and oppositely within the electrodes 11 and 13 whereby a nonuniform field is created between same which modulates in accordance with the applied frequencies. This modulation is, in turn, induced by the nonuniform electric field in the substance 15 whereby the substance vibrates in accordance with the modulated frequencies and the audio frequency is reproduced in a manner similar to the vibrating means within a conventional loud speaker. Where the electrode 11 is parabolic in shape, the audio waves may be directed with considerable efficiency in view of the minimal interfering apparatus such as holder 17 disposed about the substance 15.

It will be appreciated that the particular amplifier disclosed in FIGURE 1 is not as advantageous for higher frequencies and in applications where the transmission of harmonics without attenuation or distortion is requisite. However, it will also be appreciated by those skilled in the art that there is almost an endless variety of means to induce a modulated frequency in the electrodes 11 and 13 depending upon the power requirements, the type and range of frequencies desired, and the desired fidelity.

Transmission of sound is merely one use for a modulated nonuniform electric field. It may be employed to test materials such as substance 15 as to their ability to stand frequencies and vibrations of various magnitudes. Or it may be used to treat or to modify the nature of the material affected.

Figures 2, 3:
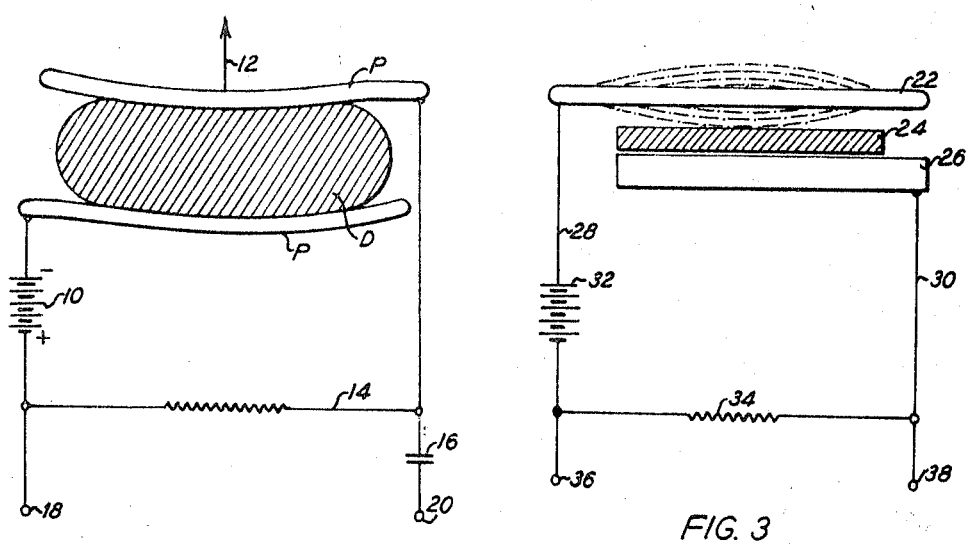
FIGURE 2 is a diagrammatic showing of the means for producing a push-pull modulated nonuniform electric field extending away from the electrodes.
FIGURE 3 is a diagrammatic showing similar to FIGURE 2 of another form of the invention.

Referring now to FIGURE 2, there is shown a power source for operating an alternate push-pull generator. In this figure P—P are metal conductor plates, each of said plates being slightly dished in the same direction and spaced from each other by a disc insulator D. Preferably the conductor plates D should be very thin whereas the insulator D will generally be composed of a highly dense insulating material. Numerals 18 and 20 show leads from a variable frequency source capable of producing, say, 1 to 1,000 kc. or if necessary 100 mc., which can be modulated in accordance with means well known to the art. Numeral 12 shows the resultant nonuniform electric field force which is induced by the plates D when a high voltage is applied thereto from the source of power 10, which may be, for example, a 500 volt D.C. electric power source. The resultant force 12 results from the curvature of plates P even though it will be understood that a great part of the electric field induced from the oppositely polarized plates P is within the insulating material D. The numeral 14 refers to a 5 megaohm resistor and 16 designates a 4 MFC condenser.

FIGURE 3 discloses a similar form for the invention wherein 22 indicates a thin metal plate or a conducting surface such as a tightly stretched rubber diaphragm with one surface metalized which is capable of rapid vibration. Located below the vibrating metal plate 22 is a dielectric plate 24 which is composed of a dense dielectric material, and below the dielectric plate 24 is a thicker plate 26 which is a large stationary, charge-carrying plate of any suitable conducting material. These plates are connected by leads 28 and 30. It will be noted that each of the plates 22, 24, and 26 is flat as distinguished from the disc plates and dielectric insulation of FIGURE 2. Lead 28 is connected to polarizing voltage source 32 which may produce a suitable polarizing voltage. The leads 28 and 30 may be connected to each other by resistor 35 of 5 megaohms. The terminals 36 and 38 are for connection to a source of high frequency input capable of producing an output frequency of between 1 and 1,000 kc., or, if desired, 100 mc., with the output voltage being capable of modulation by means known to the art. Preferably, the embodiment of FIGURE 3 is maintained in a suitable medium such as a high vacuum.

In the embodiment of FIGURE 3, a push-pull modulated nonuniform electric field beam is produced through the application of an operating current signal to the controller plates 22 and 26. The current may be a pulsating direct current or alternating current. The application of the nonuniform field to the plate 22 sets up a modulation upon one half of its cycle and the returning beam in the opposite direction causes a rotating resultant 180° for each cycle with plate 22 oscillating through the convex and concave portions with respect to the stationary plate 26. This gives rise to a nonuniform field reversal each cycle in the vicinity of plate 22.

Utilizing the embodiment shown in FIGURE 2, with its axis of operation in a horizontal plane, the resultant will be rotated only through 90°, that is, from vertical to horizontal. The aforesaid beam, described as a push-pull modulated nonuniform electric field beam, when tuned to the resonant frequency of a further substance located within the range of the vibrating nonuniform field, will induce vibration of the substance in resonance therewith.

Figure 4:
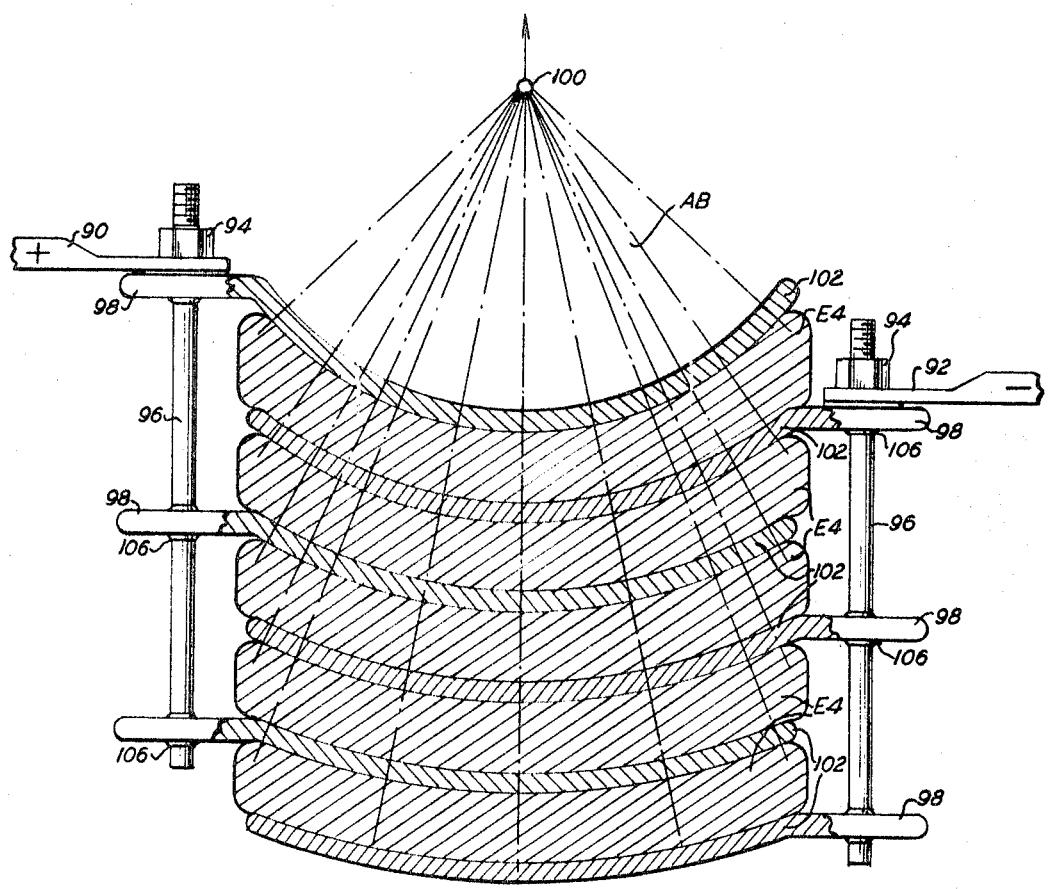
FIGURE 4 is a diagrammatic showing of a further method to produce a resultant nonuniform electric field extending away from the electrodes.

In FIGURE 4, insulating elements E4 are composed of a dense dielectric material and the plate elements 102 are composed of any suitable conducting material preferably one which is an efficient condenser plate. Direct current high voltage charges from a suitable voltage source are placed on the plates 102 through leads 90 and 92 and as a result of such charges, a nonuniform electric field is produced between the curved plates 102 and a resultant dielectrophoretic force is generated towards point 100. It is to be noted that the leads 90 and 92 are attached by plates 94 to parallel rods 96 which also serve as spacers. The disc plates designated by reference numeral 102 conform generally to the surfaces of a plurality of concentric spheres within a cylinder which has a longitudinal axis passing through the center of such spheres. Thus it will be appreciated that the letters AB designate hypothetical force rays which converge on a directional point such as point 100.

The structure of FIGURE 6 upon energization produces a resultant force in the direction of the focal point 100 with a curved surface. The greater the magnitude of potential applied, the greater the resultant force until an optimum is reached.

While I have described the embodiments of my invention, it is to be understood that it is capable of adaptations and modifications within the scope of the appended claims.

Having thus described my invention, what I claim as new and desire to secure by Letters Patent of the United States is:

1. A method of applying modulated vibrations to a resilient substance which comprises the steps of creating a strong nonuniform electric field, placing said substance within said field and applying a frequency to said field whereby said field varies between strong and weak intensities, and applying a signal to said field whereby the vibrations of said field caused by said frequency are modulated and said substance is vibrated to a significant extent in accordance with said modulated field.

2. A method in accordance with claim 1 wherein said modulated frequency is an audio frequency.

References Cited

UNITED STATES PATENTS

| | | | |
|---|---|---|---|
| 1,375,982 | 4/1921 | Thomson | 317—261 |
| 3,040,214 | 6/1962 | Slavin et al. | |
| 3,183,411 | 5/1965 | Palfi | 317—123 |
| 3,197,394 | 7/1965 | McEuen | 204—180 X |

LEE T. HIX, Primary Examiner

U.S. Cl. X.R.

310—2